Dec. 29, 1959  F. T. HILLIKER  2,919,339
FOOD SERVICE CARTS

Filed Jan. 6, 1956  2 Sheets-Sheet 1

INVENTOR.
FRANK T. HILLIKER
BY
ATTORNEY

Dec. 29, 1959  F. T. HILLIKER  2,919,339
FOOD SERVICE CARTS

Filed Jan. 6, 1956  2 Sheets-Sheet 2

INVENTOR.
FRANK T. HILLIKER
BY Ralph W. Kalish

ATTORNEY

United States Patent Office 2,919,339
Patented Dec. 29, 1959

2,919,339

FOOD SERVICE CARTS

Frank T. Hilliker, St. Louis, Mo., assignor, by mesne assignments, to The Brunswick-Balke-Collender Company, Chicago, Ill., a corporation of Delaware Application January 6, 1956, Serial No. 557,724

1 Claim. (Cl. 219—35)

This invention relates in general to mobile food tables, and more particularly, to a thermally controlled food service cart.

Heretofore, various types of carriers have been utilized for conveying food from the kitchen to the various rooms of a hospital wherein considerable point-to-point travel is involved, requiring a relatively extended period of time to complete a single meal service. During such travel it is imperative to maintain the food at desired temperatures for rendering same palatable as well as beneficial. In unsuccessful efforts to achieve this feature, such carriers have contained a heating unit which is operated, as by connection to a source of electricity, before and during the loading of the dishes in the kitchen upon the carrier. However, such carriers have not contained heat storage means so that during service there will occur a steady heat loss to the atmosphere with the normally hot food dishes becoming progressively cooler and, hence, unappetizing. Understandably, if a short distance is to be traversed, the food may maintain the proper warmth from the heating effected in the kitchen, but with the longer, customary route, the carts must be periodically returned to the kitchen for reheating of the cooled food, or to receive other portions of what should have been a normal carrier load. Such an operation is manifestly quite costly from the standpoint of labor, as the time required for the mere service is unduly prolonged. In many instances, hospitals have continuously increased their number of food carts so that more meals may be served simultaneously. Patently, such an expedient is uneconomical, as it occasions marked outlay for equipment, as well as upkeep and maintenance thereof, together with the requisite additional personnel.

Certain types of carts have been supplied with plug-equipped conductor cords for connection to wall outlets or the like throughout the hospital, so that the heating unit may be activated at intervals during travel. But this method has not been satisfactory, as many hospitals do not have appropriately located outlets, so that most times the carts will be, perforce, stopped at inconvenient locations with attendant time loss in the service.

Also, currently used carts of this character have not been designed to maintain certain food preparations in a cooled state, such as salads, fruits, desserts, and the like. Normally, units carrying such cold dishes expose the same to the atmosphere during cart travel, with consequent heat absorption and thereby resulting in diminution in palatability.

Therefore, it is an object of the present invention to provide a food service cart having means for heat storage so that sufficient heat may be supplied to the food during the entire travel of the cart, as well as for reloading of the cart and service of such.

It is another object of the present invention to provide a food service cart having heat storage means together with novel thermal control means for maintaining the heated food-containing compartment at a predetermined elevated temperature.

It is a further object of the present invention to provide a food service cart which incorporates refrigerating means for maintaining food carried thereby in a cool state during cart travel, as well as reloadings thereof.

It is an additional object of the present invention to provide a food service cart incorporating a heated compartment and a refrigerated compartment with means for preventing heat-transfer therebetween.

It is a still further object of the present invention to provide a food service cart which constitutes a self-contained unit for the simultaneous serving of hot and cold food preparations; which is reliable and durable in usage; which does not require servicing during use so that a full load may be served at predetermined temperatures; which may be economically fabricated; and the use of which provides a marked economy in operation.

These and other detailed objects are obtained by the structures illustrated in the accompanying drawings in which.

Figure 1:
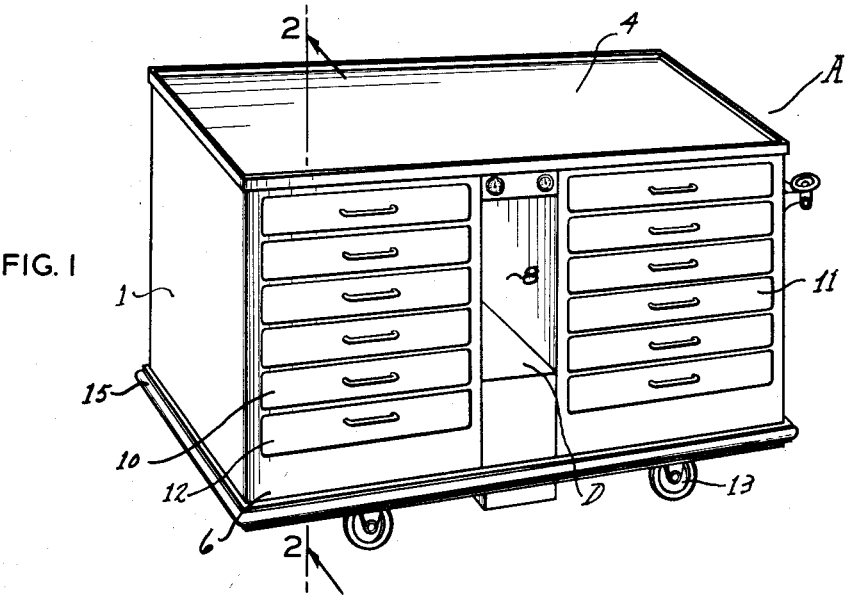
Figure 1 is a perspective view of a food service cart constructed in accordance with and embodying the present invention.

Referring now by reference characters to the drawings, A generally designates a food service cart having a body forming a cabinet, preferably of sheet metal, comprising parallel end walls 1, 2, a rear or back wall 3, a top wall 4, the upper surface of which provides a serving table, a bottom wall 5, and front wall 6; there being spaced apart intermediate walls 7, 8 extending from front to back of cart A, in parallel relationship to end walls 1, 2, for respectively cooperating with same to define the sides of compartments B, C. Mounted on the inner faces of said walls 1, 7 and 2, 8 are vertically spaced, horizontally aligned runners 9, for slideably supporting banks of drawers 10, 11, respectively, said drawers being spaced to permit free circulation of air within said compartments B, C. Each drawer is provided with a widened front, handle-equipped panel 12 for detaining engagement on its inward edge surfaces with proximate portions of front wall 6 to limit their inward movement. The drawers of said banks 10, 11 are designed to receive dishes and similar tableware containing food servings, and may, if desired, be internally divided, as by partitions (not shown) to receive a complete serving of the various foods carried in the compartments B, C, such as a main plate, side dishes, cup and saucer, bowl or the like, whereby each drawer or combination of corresponding drawers in the compartments may contain an entire meal.

Cart A is provided with casters 13 suitably mounted on bottom wall 5, as well as a push-bar or manipulating handle 14 secured upon end wall 2 for facilitating pushing or rolling of cart A for positioning or travel. Additionally, a peripheral bumper 15 may be mounted about the lower end of cart A to effectively protect same from damage through inadvertent collisions.

The drawers 10 of compartment B are designed to receive those dishes containing foods to be served while hot or at normally elevated temperatures, and is adapted to maintain such foods at a predetermined temperature during usage of cart A by means now to be described. At the lower end of compartment B there is provided a heat storage chamber 16, the upper wall of which is constituted of an insulating member 17, as asbestos sheeting, extending beneath the bottom drawer 10 between end wall 1 and intermediate wall 7, and from front wall 6 to a point spaced from rear wall 3 (as may best be seen in Figure 2). The lower end of chamber 16 consists of a similar insulating sheet member 18 extending entirely across the bottom of compartment B, with insulation, as asbestos and the like, as indicated at 19, provided around all four sides of said compartment between said upper and lower insulating members 17, 18. Immediately below upper insulating member 17, there is disposed a heat storage mass 20, which may, preferably, consist of a steel plate of the order of ½" thickness and being of substantially like extent as said insulating member 17; said plate 20 being supported upon short posts 21 resting at their lower ends upon a base plate 21' disposed on lower, insulating member 18 so as to develop a space therebetween for receiving a space-heating unit 22 of any suitable type, such as a coil, high resistance heater.

Figure 2:
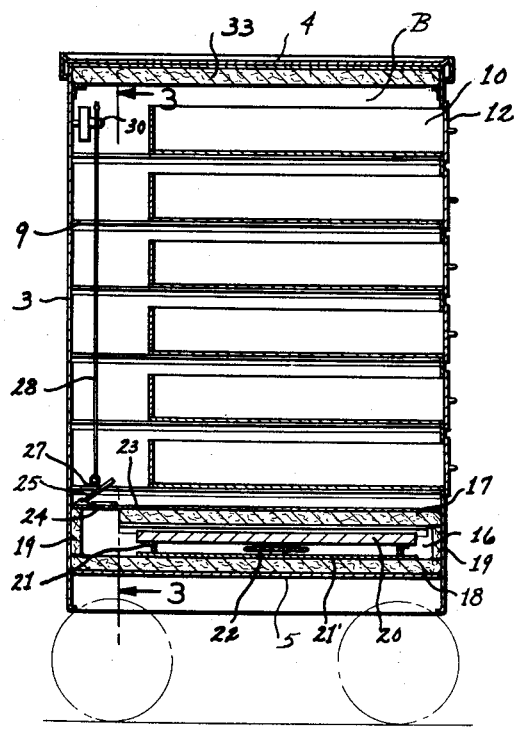
Figure 2 is a vertical transverse section taken on the line 2—2 of Figure 1.
Figure 3:
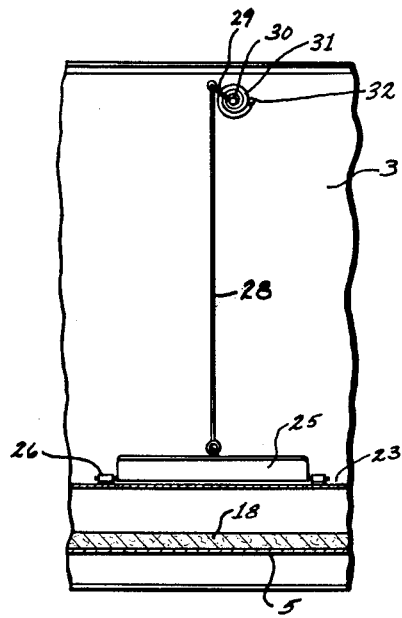
Figure 3 is a fragmentary vertical transverse section taken on the line 3—3 of Figure 2.

Separating heat storage chamber 16 from the drawer-containing portion of compartment B is a transverse partition plate 23, against the underface of which upper insulating member 17 tightly abuts; said plate 23 extending from front wall 6 to back wall 3 and from end wall 1 to intermediate wall 7, being appropriately secured thereto, and thereby completes enclosure of chamber 16. Partition plate 23, intermediate its ends and between the inner edge of insulating member 17 and back wall 3 is provided with an elongated opening 24 adapted for closure by a damper or flap 25 suitably hinged on said plate 23 as at 26 for upward pivotal movement between open and closed positions. Extending upwardly from the upper central surface of damper 25 is a short rigid arm 27 at the upper end of which is pivotally secured the lower end of a vertically extending operating link 28, said link 28 being swingably engaged at its upper end to one end of a short connecting arm 29, the other or lower end of which is fixed to a shaft-forming member 30, the axis of which is normal to rear wall 3. Rigid, by any suitable means, with shaft 30, is the inner end of a spiral-type bimetallic thermostat 31; the point of attachment of bimetallic member 31 thereon being rearwardly of the point of engagement between connecting arm 29 and shaft 30 (see Figure 3). The outer end of bimetallic member 31 is anchored on a pin 32 secured to rear wall 3. As shown in Figure 2, drawers constituting bank 10 terminate spacedly from rear wall 3, substantially in alignment with the inner end of upper insulating member 17, cooperating with said rear wall 3, to define a passage or conduit through which heat may ascend from compartment 16 upon opening of damper 25 for circulation about said drawers.

The undersurface of top wall 4 may be provided with an insulating member 33 to prevent heat loss therethrough.

In operation, heating unit 22 is activated, as by connection to a source of current, as through an outlet in a hospital kitchen, to provide a charge of heat to the heat storage mass or metallic plate 20; this being accomplished prior to travel of cart A, before and during the loading of drawers 10, 11 with the food-containing tableware to be served. In accordance with principles well understood in the art, a relatively high temperature may be provided heat storage mass 20 such as, in the order of 540° and the like, which quantity of heat will be reliably retained through the fully insulated character of chamber 16. Bimetallic thermostat 31 is constituted of such metals and so designed as to effect contraction when the ambient in the drawer-containing portion of compartment B falls below a predetermined temperature, such as 140°. In such event bimetallic thermostat 31 will contractingly spiral in a clockwise direction with attendant rotation of shaft 30 whereupon link 28 will be moved upwardly to cause upward pivoting and opening of damper 25 to allow heat to flow from heat storage chamber 16 upwardly into the drawer-containing portion of compartment B. Once the ambient therein has attained the desired, predetermined temperature, bimetallic thermostat 31 will have expanded, spiralling in a counter-clockwise direction, so as to cause link 28 to be returned downwardly with consequent closing movement of damper 25, thereby discontinuing heat flow.

It will thus be seen that heat may be effectively stored in heat storage chamber 16 so as to provide necessary heat to the drawers for maintaining the food in a heated state until served. It has been found that by the present invention the heat storage capacity of chamber 16 is adequate to permit cart A to be continuously utilized for an extended period of time, such as at least two hours, without requiring re-charging of the heat storage member. Thus, by the operation of cart A there is no danger of normally hot foods being served in a cold, unappetizing condition as is so usual with current constructions. Furthermore, without the necessity of re-activation of heater 22, cart A may, during the course of a meal, be repeatedly returned to the kitchen for additional loads, with full assurance that such will be preserved in desired heated condition until served. Despite the length of time required for the serving operation, for as many meals as cart A may need accommodate, the food will thus be reliably maintained in kitchen-prepared state. Additionally, by the use of cart A, an operator is obviated the need to be continuously attempting to locate electrical outlets along the route for "plugging" in the heater to keep heating the food, nor is there the need to make frequent returns to the kitchen for heated dishes for immediate service, which latter procedure entails considerable labor and expense, and in many cases, the necessity of a relatively great number of mobile units so as to complete the serving operation before the food cools.

Figure 4:
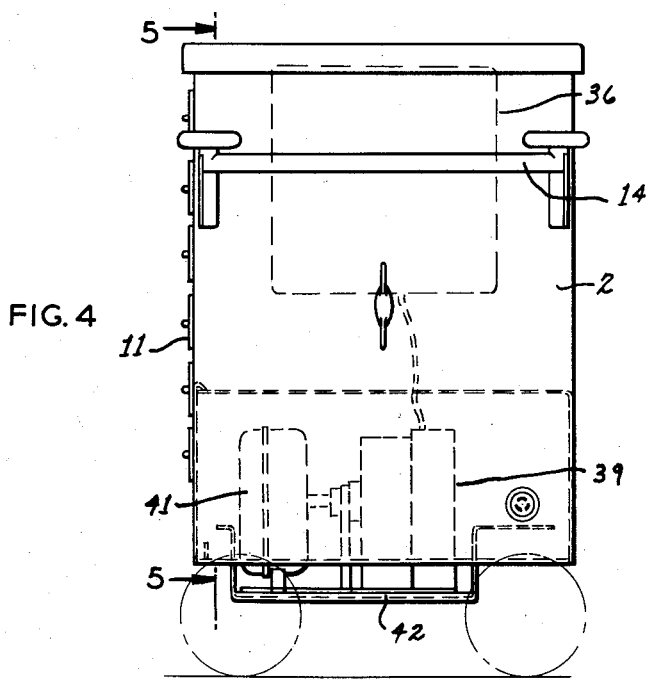
Figure 4 is an end view of the food service cart.
Figure 5:
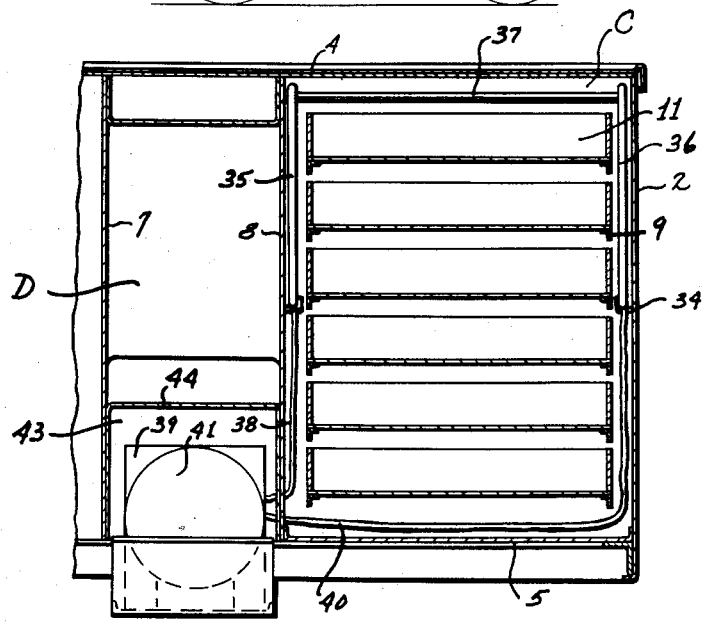
Figure 5 is a vertical transverse section taken on the line 5—5 of Figure 4.

Drawers 11 in compartment C are designed to hold food preparations which are desirably served in a cool or low temperature state, such as salads, desserts, and the like, and accordingly, means are provided for maintaining compartment C under refrigerated conditions so that during extensive routing of cart A the food preparations in said compartment C will be served in their intended, cold state. To this end there is mounted, as by suitable brackets 34, on the upper portions of the inner faces of intermediate wall 8 and end wall 2, but spaced therefrom, refrigeration plates 35, 36, respectively, commonly known as "dole" plates, and being of conventional design; said plates 35, 36 being in communication at their upper ends adjacent top wall 4 by a manifold 37 for refrigerant circulation. At its lower end plate 35 is connected by a pipe 38 to a compressor 39, while plate 36 at its lower end is connected thereto by a return conduit 40 for completing the system. Said compressor 39 and a prime mover 41 to which the same is operably engaged, are mounted upon a saddle-forming member 42, suitably mounted between compartments B and C within a chamber 43 defined by a transverse wall 44, extending between intermediate walls 7, 8 upwardly of their lower ends, and adjacent portions of rear wall 3 and front wall 6, as indicated in Figure 4. Said saddle 42 is adapted for facile securement to the proximate portions of cart A to permit ready removal therefrom so that compressor 39 and prime mover 41 are rendered accessible for servicing and repair.

By operation of compressor 39 pursuant to operation of prime mover 41 upon "plugging in" of same by connection of cart A to a source of current, a continuous flow of refrigerant is circulated through the system comprising plates 35 and 36, so that compartment C is reduced to a cooled state. As plates 35, 36 are mounted in the upper portion of compartment C cooling will be provided the lower drawers by normal downward flow of the cooled air surrounding plates 35, 36. With compressor 39 shut down upon disconnection of cart A for meal servicing, compartment C will be maintained in a cooled condition since plates 35, 36 serve as a holding reservoir for cold during cart usage. Any heat gain is extremely limited so that said compartment C will remain at substantially a desired, below room temperature throughout the meal service period.

Referring now to Figure 1, it will be seen that the upper portions of intermediate walls 7, 8 in conjunction with transverse wall 44, top wall 4 and rear wall 3 form an open-front compartment D between food-containing compartments B, C which thus creates an intervening insulating air space to prevent heat transfer from one to the other, as well as providing storage space for empty food trays, so that upon arrival of cart A at a particular serving station the operator will have an available supply of trays. Tray loading of dishes withdrawn from drawers in compartments B, C may be easily effected on the upper table-forming surface of top wall 4 which presents a convenient working area.

Thus, cart A is a self contained unit capable of the simultaneous service of foods maintained above room temperature and below room temperature. The heated compartment and the refrigerated compartment are separated by air insulation so that heat transfer is prevented and the foods are reliably retained in their desired thermal states. It will be noted that the refrigeration system is reliable and quite unique and obviates the inherent inadequacies of ice-cooled cabinets as heretofore utilized.

It should be pointed out that compartment B is designed to be heated from the bottom upwardly by flow from heat storage chamber 16 into the upper portions of the compartment in accordance with the expected flow of the less dense air. Likewise, in compartment C the cooling plates are located upwardly therein so that the denser, cooled air will flow downwardly to thus cool said compartment from the upper end to the lower end.

It should be understood that changes and modifications in the formation, construction, arrangement, and combination of the several parts of the food service cart may be made and substituted for these herein shown and described without departing from the nature and principle of my invention.

Having thus described by invention, what I claim and desire to secure by Letters Patent is:

A mobile food service unit having a cabinet with a compartment for receiving food-containing tableware, self-contained, independent heating means for maintaining the food at a predetermined temperature when the unit is remote from an extraneous heat supply comprising an enclosed heat-reservoir chamber, having top, bottom, and side walls in the lower portion of the cabinet beneath said compartment, the walls of said chamber being insulated against accidental heat loss, a metallic heat-retaining member presented in said chamber, there being an opening in the top wall of said chamber for communication of the same with said compartment, a closure for said opening, thermally controlled means for operating said closure responsive to the temperature of said compartment for permitting flow of heated air from said chamber to said compartment for maintaining the latter at a predetermined temperature and a high resistance heating unit disposed in said heat-reservoir chamber beneath said heat-retaining member and being adapted for periodic energization for providing a charge of heat to said heat-retaining member whereby upon de-energization of said heating unit said heat-retaining member will continue to provide a source of heat for storage in the heat-reservoir chamber for ultimate discharge therefrom to the compartment for temperature maintenance of the latter.

References Cited in the file of this patent

UNITED STATES PATENTS

| | | |
|---|---|---|
| 514,864 | McElroy | Feb. 13, 1894 |
| 1,513,357 | Webber | Oct. 28, 1924 |
| 1,678,730 | Johnson | July 31, 1928 |
| 1,901,509 | Hall | Mar. 14, 1933 |
| 2,187,767 | Akers | Jan. 23, 1940 |
| 2,309,513 | Kramer | Jan. 26, 1943 |
| 2,563,253 | Levin | Aug. 7, 1951 |
| 2,768,505 | Goodwin | Oct. 30, 1956 |

FOREIGN PATENTS

| | | |
|---|---|---|
| 77,784 | Switzerland | June 17, 1918 |